W. J. Clark.

Making Bolts.

No. 1,917. Reissued Mar. 28, 1865.

Witnesses:

A. W. Hulburd

Jno. A. Patten

Inventor:

William J. Clark.

By atty. A. B. Stoughton

THE GRAPHIC CO. PHOTO-LITH. 39 & 41 PARK PLACE, N.Y.

UNITED STATES PATENT OFFICE.

WILLIAM J. CLARK, OF SOUTHINGTON, CONNECTICUT.

IMPROVEMENT IN BOLTS.

Specification forming part of Letters Patent No. 43,669 dated August 2, 1864; antedated February 2, 1864; Reissue No. 1,917, dated March 28, 1865.

DIVISION B.

*To all whom it may concern:*

Be it known that I, WILLIAM J. CLARK, of the town of Southington, in the county of Hartford and State of Connecticut, have invented a new and useful Improvement in the Manufacture of Bolts from Round Rods or Bars; and I do hereby declare the following to be a full, clear, and exact description of the same, reference being had to the accompanying drawings, making a part of this specification, in which—

Figure 1:
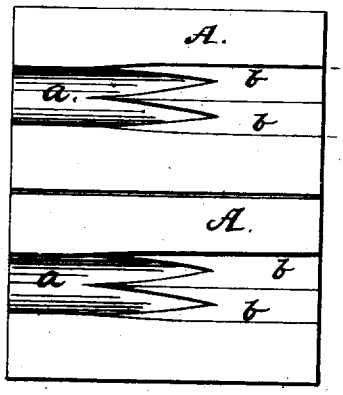
Figure 2:
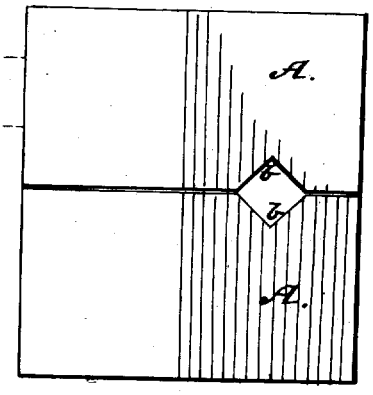
Figure 3:
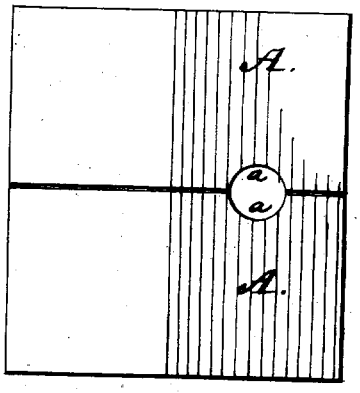
Figure 4:
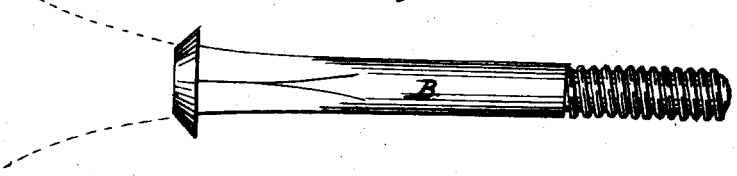

Figure 1 represents a view of the dies opened up, and in which the bolt in question may be formed. Fig. 2 represents the front or anvil end of the dies. Fig. 3 represents the rear or cylindrical end of the dies. Fig. 4 represents the bolt as complete and of one form of head; but I do not confine myself to any particular form of head.

The nature of this part of my invention consists in the production of a bolt made from a round bar or rod, a portion of which bolt is square or angular and a portion left round, as in the rod or bar, the sectional areas of the two portions being similar, though of different forms and dimensions—as, for instance, the round portion is of greater diameter than the distance from face to face of the square or angular portion, and the distance diagonally from corner to corner of the square or angular portion is of greater length than the diameter of the round portion, the displacement and rearranging of the metal in the blank to thus shape the bolt being accomplished mainly by lateral pressure or compression of the dies.

To enable others skilled in the art to make and use my invention, I will proceed to describe the same with reference to the drawings.

I construct a pair of dies, A A, of cast-iron or other metal, making the grooves therein for a portion of their length of a semicylindrical form, as shown at *a*, and the remaining portion *b* of an angular form. Each die A being provided with a groove of this character, will permit the two, when placed together, to present at one end a cylindrical opening corresponding in diameter to that of the cylindrical bolt-blank, while the opening at the opposite end, instead of being cylindrical, will be square or angular, but of similar sectional area as that of the cylindrical end, so that when the two dies are forced together upon the bolt-blank, (which has been previously heated to a proper degree,) that portion of the blank lying within the angular portion of the grooves will be swaged out and forced to take the angular form corresponding to that of the angular portion of the groove, and the part lying within the cylindrical portion of the groove will retain its original shape. The dies thus holding and containing the partially-wrought bolt-blank form an anvil upon which a portion of the blank projecting from the dies, and at the end thereof which contains the angular groove, is upset and formed into a head by any proper machinery that will drive said projecting portion of the blank toward the body or shank of the bolt and give it the desired shape or form. The square or angular grooves in the dies are of such length as will give the required square or angular form to the bolt, and thence merging into the semicylindrical form of the grooves in the dies, which are made to conform to the size of the rod to be used in them.

B, Fig. 4, represents a bolt made in the dies and after the herein-described manner of procedure. Its round and its square or angular portions are of similar sectional areas; but the diameter of the round portion is greater than the distance from face to face on the square portion, as shown by the round and square or angular openings in the dies, while the distance from corner to corner diagonally of the square portion of the bolt is greater than the diameter of the round portion, so that the sectional areas of the two portions may be the same, while their forms are changed by the act of making the square or angular portion in the dies.

It will be perceived by reference to Figs. 1 and 4 that the lines of the square or angular portion of the grooves in the die give a somewhat different form to the lines of the square or angular portion of the bolt made or shaped in said grooves. This effect is caused by the upsetting or driving in of that portion of the blank that forms the head of the bolt either by slightly springing the dies or by forcing some portion of the metal endwise into the dies, or by both, so that while the square or angular portion of the bolt is formed mainly by the lateral compression of the dies, yet some portion of it is attained by driving up the metal into them in the act of forming the head.

The pulling up of the square or angular portion of the shank of the bolt immediately under the head is not intentional, but is due, as above stated, to the upsetting or driving in of the projecting end of the blank to form the head, and is incident to the operation of heading the bolt, and though I have laid no special claim to it, yet it is from consequence a part of the result attained by that operation.

Having thus fully described my invention, what I claim under this patent is—

A bolt made from a round rod or bar, a portion of which bolt shall be square or angular and a portion round, as in the rod or bar, and so that the sectional areas of the square and round portions shall be similar, the diameter of the round greater than the distance from face to face of said square portion, and the distance from corner to corner diagonally of the square portion be greater than the diameter of the round, substantially as described.

WM. J. CLARK.

Witnesses:

A. B. STOUGHTON,

HAVER. FENDRICH.